(12) United States Patent
Fujita et al.

(10) Patent No.: US 10,922,858 B2
(45) Date of Patent: Feb. 16, 2021

(54) DISPLAY APPARATUS, DISPLAY METHOD, AND RECORDING MEDIUM

(71) Applicant: YOKOGAWA ELECTRIC CORPORATION, Tokyo (JP)

(72) Inventors: Sho Fujita, Tokyo (JP); Kimikazu Takahashi, Tokyo (JP); Nobuaki Ema, Tokyo (JP)

(73) Assignee: YOKOGAWA ELECTRIC CORPORATION, Tokyo (JP)

(*) Notice: Subject to any disclaimer, the term of this patent is extended or adjusted under 35 U.S.C. 154(b) by 0 days.

(21) Appl. No.: 15/964,987

(22) Filed: Apr. 27, 2018

(65) Prior Publication Data

US 2018/0315227 A1 Nov. 1, 2018

(30) Foreign Application Priority Data

Apr. 28, 2017 (JP) .................. 2017-089881

(51) Int. Cl.
*G06T 11/20* (2006.01)
*G01D 7/10* (2006.01)
(Continued)

(52) U.S. Cl.
CPC .............. *G06T 11/203* (2013.01); *G01D 7/10* (2013.01); *G06F 11/322* (2013.01); *G06T 11/206* (2013.01); *G06F 11/3058* (2013.01)

(58) Field of Classification Search
CPC .... G06F 16/2477; G06F 11/321; G06F 11/34; G06F 11/322; G06F 11/323; G06F 11/3466; G06F 11/3476; G06F 11/30; G06T 11/206; G06T 2200/24; G06T 11/203; G01R 13/02; G01R 13/345; G06Q 10/0639; H04L 43/04; H04L 43/045; H04L 43/16; A61B 5/0006; A61B 5/0452; G06K 11/00; G06K 9/00496
See application file for complete search history.

(56) References Cited

U.S. PATENT DOCUMENTS 10,078,731 B2 * 9/2018 Averina ................ G06T 11/206
2010/0023635 A1 * 1/2010 Labonte .................. H04L 43/00
709/231
(Continued)

FOREIGN PATENT DOCUMENTS

JP H06-331381 A 12/1994
JP 2004-038357 A 2/2004
(Continued)

*Primary Examiner* — Xiao M Wu
*Assistant Examiner* — Scott E Sonners
(74) *Attorney, Agent, or Firm* — Osha Bergman Watanabe & Burton LLP (57) ABSTRACT

A display apparatus includes: an operation input device configured to designate a data range of an observed value; an analysis condition setting device configured to determine an analysis range or an analysis parameter of the observed value, corresponding to the number of samples included in the data range; a computation device configured to analyze a waveform or a trend of the observed value on the basis of the analysis range or analysis parameter; and a display screen generation device configured to cause a display device to display a waveform or a straight line as a computation result of the computation device.

12 Claims, 4 Drawing Sheets

(51) Int. Cl.
*G06F 11/32* (2006.01)
*G06F 11/30* (2006.01)

(56) References Cited

U.S. PATENT DOCUMENTS

| | | | | |
|---|---|---|---|---|
| 2010/0318026 | A1* | 12/2010 | Grunwald | A61B 5/742 604/95.05 |
| 2013/0325158 | A1* | 12/2013 | Kobayashi | G05B 23/0243 700/108 |
| 2014/0276181 | A1* | 9/2014 | Sun | A61B 5/04012 600/544 |
| 2015/0254880 | A1* | 9/2015 | Brayanov | G06T 11/206 345/440 |

FOREIGN PATENT DOCUMENTS

| | | |
|---|---|---|
| JP | 2008-140110 A | 6/2008 |
| JP | 2010-027076 A | 2/2010 |
| JP | 2014-167706 A | 9/2014 |
| JP | 5868784 B2 | 2/2016 |
| JP | 2016-143169 A | 8/2016 |

\* cited by examiner

DISPLAY APPARATUS, DISPLAY METHOD, AND RECORDING MEDIUM

CROSS-REFERENCE TO RELATED APPLICATION

This application claims priority from Japanese Patent Application No. 2017-089881 filed with the Japan Patent Office on Apr. 28, 2017, the entire content of which is hereby incorporated by reference.

BACKGROUND

1. Technical Field

The present invention relates to a display apparatus, a display method, and a program.

2. Description of Related Art

An operation monitoring terminal is typically provided in a control system in some cases to manipulate the operation of a process being a control target. The use of this terminal allows an operator being a user to freely select some of various pieces of time-series data indicating, for example, state quantities of the process measured by field devices and the like. In many cases, the operation terminal includes a display apparatus configured to display, in time series, the state quantities such as process control system and recorder. For example, a process monitoring system described in Japanese Patent No. 5868784 judges the state of a plant, on the basis of time-series data outputted from field devices that measure state quantities in an industrial process, and change trends in the state quantities. As a result of the judgment, the obtained state and state quantities are displayed. Moreover, a monitoring apparatus described in JP-A-2014-167706 outputs a trend graph on the basis of a physical quantity measured by a sensor. In this graph, time-series data of the physical quantity including a future predicted value of the physical quantity is presented in graphical form. A user interprets a change trend in time-series data selected by a display device of an operation monitoring terminal to, for example, find an abnormality and predict a future value. At this point in time, firstly, the user performs an operation of setting a range of a time axis of interest to the user. Next, the user monitors time-series data displayed within the set range.

Moreover, even if the state quantity acquired in a controlled process has a constant value, disturbance or noise from an external environment may be superimposed on the state quantity. A frequency component (such as a period) of disturbance or noise varies according to the measurement point in many cases.

SUMMARY

A display apparatus according to one or more embodiments of the present invention includes: an operation input device configured to designate a data range of an observed value; an analysis condition setting device configured to determine an analysis range or an analysis parameter of the observed value, corresponding to the number of samples included in the data range; a computation device configured to analyze a waveform or a trend of the observed value on the basis of the analysis range or analysis parameter; and a display screen generation device configured to cause a display device to display a waveform or a straight line as a computation result of the computation device.

DETAILED DESCRIPTION OF EMBODIMENTS

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Among points (state quantities) acquired from field devices, one user generally needs to manipulate and monitor a plurality of points. The number of points to be manipulated and monitored is several tens for a small-scale plant, and may run into several thousands for a large-scale plant. However, a range of interest to the user is not necessarily uniform for each measurement point. Moreover, among components included in time-series data, especially a high-frequency component may prevent the interpretation of the time-series data. Hence, it is being discussed to reduce the high-frequency component by causing the time-series data to pass through a low-pass filter (LPF: Low Pass Filter). If the frequency component of noise or disturbance varies according to the measurement point, it is necessary to change the cutoff frequency of the LPF. The cutoff frequency is changed according to multiple measurement points, which places a burden on the user. In addition, when the cutoff frequency is wrongly selected, a main component representing an event to be grasped may be reduced or removed. In this case, a change in the time-series data may escape the user's notice.

Moreover, it is expected that intelligent field devices that can detect and output their own state autonomously become further widespread in the future. However, as the number of monitoring targets per user is increased, a burden on the user is heavy due to the interpretation of time-series data and the prediction of a future value. Hence, only a part of the points to be manipulated and monitored may be able to be monitored. Hence, information acquired from the field devices may not be used.

A display apparatus, a display method, and a program according to one or more embodiments of the present invention have been developed considering the above points. The display apparatus, the display method, and the program according to one or more embodiments of the present invention easily set an analysis condition on time-series data when the user monitors the time-series data.

(1) A display apparatus according to one or more embodiments of the present invention includes: an operation input device configured to designate a data range of an observed value; an analysis condition setting device configured to determine an analysis range or an analysis parameter of the observed value, corresponding to the number of samples included in the data range; a computation device configured to analyze a waveform or a trend of the observed value on the basis of the analysis range or analysis parameter; and a display screen generation device configured to cause a display device to display a waveform or a straight line as a computation result of the computation device.

(2) In the above-mentioned display apparatus, the computation device executes a low-pass filter operation on the observed value on the basis of the analysis range or analysis parameter, and the display screen generation device causes the display device to display a waveform of a result of the low-pass filter operation by the computation device.

(3) In the above-mentioned display apparatus, the analysis condition setting device calculates, from the data range, a filter length and a filter coefficient, which correspond to a cutoff frequency of the low-pass filter operation.

(4) In the above-mentioned display apparatus, the computation device calculates a slope indicating a change trend in the observed value on the basis of the analysis range or analysis parameter, and the display screen generation device causes the display device to display a waveform of the observed value and a straight line having the calculated slope corresponding to the waveform.

(5) In the above-mentioned display apparatus, the computation device includes a change trend calculation device configured to calculate a slope of a linear function indicating the change trend in the observed values within the analysis range in such a manner as to minimize an objective function.

(6) In the above-mentioned display apparatus, the analysis condition setting device determines that a predetermined proportion of the analysis range is the data range.

(7) A display method according to one or more embodiments of the present invention includes: using a display apparatus; designating a data range of an observed value; setting an analysis range or an analysis parameter of the observed value, corresponding to the number of samples included in the data range; analyzing a waveform or a trend of the observed value on the basis of the analysis range or analysis parameter; and displaying a waveform or a straight line as a computation result of the computation step.

(8) In the above-mentioned display method, analyzing includes executing a low-pass filter operation on the observed value on the basis of the analysis range or analysis parameter, and displaying a waveform or a straight line includes displaying a waveform of a result of the low-pass filter operation.

(9) A program, according to one or more embodiments of the present invention, for causing a computer included in a display apparatus to execute: an operation input command to designate a data range of an observed value; an analysis condition setting command to determine an analysis range or an analysis parameter of the observed value, corresponding to the number of samples included in the data range; a computation command to analyze a waveform or a trend of the observed value on the basis of the analysis range or analysis parameter; and a display screen generation command to cause a display device to display a waveform or a straight line as a computation result of the computation command.

(10) In the above-mentioned program, the computation command causes a low-pass filter operation to be executed on the observed value on the basis of the analysis range or analysis parameter, and the display screen generation command causes a display device to display a result of the low-pass filter operation.

(11) A non-transitory computer-readable recording medium, according to one or more embodiments of the present invention, that has recorded a program for causing a computer included in a display apparatus to execute: an operation input command to designate a data range of an observed value; an analysis condition setting command to determine an analysis range or an analysis parameter of the observed value, corresponding to the number of samples included in the data range; a computation command to analyze a waveform or a trend of the observed value on the basis of the analysis range or analysis parameter; and a display screen generation command to cause a display device to display a waveform or a straight line as a computation result of the computation command.

(12) In the above-mentioned recording medium, the computation command causes a low-pass filter operation to be executed on the observed value on the basis of the analysis range or analysis parameter, and the display screen generation command causes a display device to display a result of the low-pass filter operation.

When a user monitors time-series data, the display apparatus according to one or more embodiments of the present invention can easily set an analysis condition. Here, the time-series data is processed on the analysis condition tied to a display condition of interest to the user. Moreover, when the user observes the time-series data, an operation to be performed by the user only for the setting of the analysis condition at every change in a display range (data range) becomes unnecessary. Hence, it is avoided to overlook an abnormality in a change trend that can occur when an inappropriate analysis condition is set.

A display apparatus, a display method, and a program according to one or more embodiments of the present invention are described hereinafter with reference to the drawings.

Firstly, an example of the configuration of a display apparatus according to one or more embodiments of the present invention is described.

Figure 1:
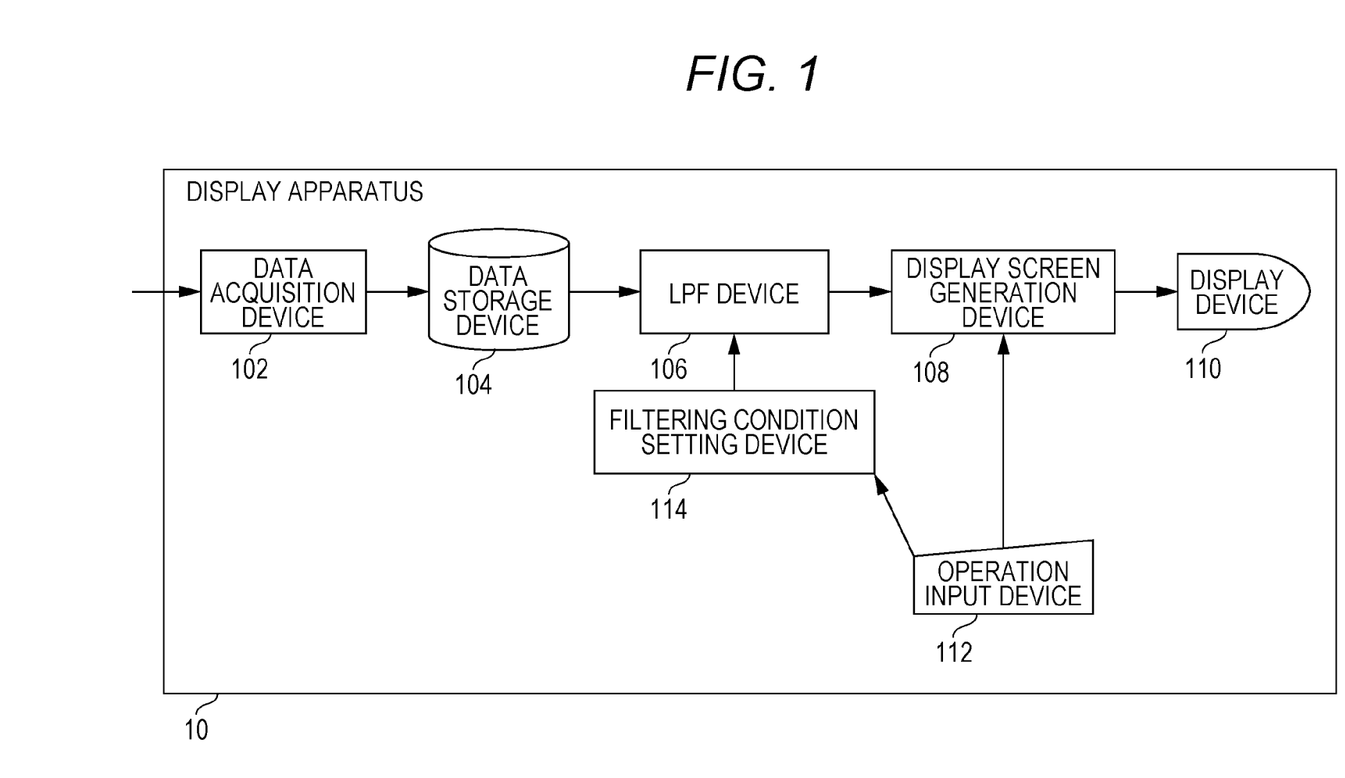
FIG. 1 is a block diagram illustrating an example of the configuration of a display apparatus according to one or more embodiments of the present invention.

FIG. 1 is a block diagram illustrating an example of the configuration of the display apparatus according to one or more embodiments of the present invention.

A display apparatus 10 according to one or more embodiments of the present invention is configured in such a manner as to include a data acquisition device 102, a data storage device 104, an LPF device 106, a display screen generation device 108, a display device 110, an operation input device 112, and a filtering condition setting device 114.

The data acquisition device 102 acquires observation data from the outside of the display apparatus 10. The observation data is any of an observed value and a state value at a certain point in time obtained from a field device or the like, or a set of these values. The observed value is a result obtained by measuring the state of a process by a field device (for example, temperature or a flow rate). The state value is a value indicating, for example, a self-diagnostic result of an intelligent field device. The observed value and the state value are simply required to be values that can change over time. The data acquisition device 102 receives the observation data by wired or wireless connection from another device via a network. Means for the data acquisition device 102 to acquire observation data is not necessarily a network. For example, the data acquisition device 102 may be detachable from a storage medium such as flash memory or HDD (hard disk drive), and read observation data from the storage medium mounted on the data acquisition device 102.

The data storage device 104 stores observation data inputted from the data acquisition device 102. Observation data is accumulated in the data storage device 104 in the order of times when an observed value is acquired. The accumulated observation data is formed as time-series data indicating an observed value at each point in time.

The LPF device 106 performs a low-pass process on observed values up to the current point in time. The LPF device 106 specifies a cutoff frequency indicated by filtering condition information inputted from the filtering condition setting device 114, and extracts the observed values being analysis targets up to the current point in time, from the data storage device 104. The current point in time indicates the latest point in time at that time. The LPF device 106 computes an output value through the low-pass process. The LPF device 106, for example, takes a moving average as the low-pass process. The moving average is the calculation of an average value of observed values at points in time included in a period of a filter length calculated from the cutoff frequency. According to the low-pass process, a component of a frequency equal to or higher than a predetermined cutoff frequency (a high-frequency component) is removed. As a result, a component of a frequency lower than the cutoff frequency (a low-frequency component) passes. Hence, a temporal change in the output value indicating the low-frequency component of the observed value is smoothed more than a temporal change in the observed value inputted from the filtering condition setting device 114. The LPF device 106 outputs output data indicating the output value at each point in time to the display screen generation device 108.

The display screen generation device 108 generates display screen data for illustrating, in a predetermined display area, the output value at each point in time indicated by the output data inputted from the LPF device 106.

More specifically, the display screen generation device 108 determines a display range corresponding to a certain period determined by coordinate values displayed in the display area, on the basis of an operation signal inputted from the operation input device 112. As an example, it is assumed that the display range and an initial value of a period corresponding to a display width being the width of the display range in the horizontal direction are preset. The display area is part or the entire display screen (display) where the display device 110 can display information.

The display screen generation device 108 may update the display range for displaying the output values indicated by the output data, on the basis of coordinates designated by an operation signal newly inputted from the operation input device 112. The display screen generation device 108 specifies, for example, a designated range taking coordinates in the horizontal direction of two points designated by the operation signal as the starting point and the endpoint, in the display area. The unit of the coordinate and the designated width in the display area is, for example, the number of pixels or the number of points. The display screen generation device 108 determines a new display range corresponding to the specified designated range. Here, the display screen generation device 108 converts, for example, the coordinate values of the starting point and the endpoint of the specified designated range into points in time corresponding to the starting point and the endpoint of the new display range where output data is displayed, on the basis of a preset parameter. A parameter calculated by a linear function indicating a correspondence between a coordinate value in the display area and a point in time corresponding to an output value forming output data may be used as the set parameter. In a display example described below, the relationship between the width of the display area and the length of a predetermined period with the current point in time as the endpoint is applied as the correspondence. The display screen generation device 108 then extracts an output value at each point in time within the new display range from the output data inputted. The display screen generation device 108 converts the extracted output value at each point in time and the point in time into coordinate values in the vertical direction and the horizontal direction, respectively. The display screen generation device 108 then generates display screen data representing a predetermined graphic (for example, a plot, line segment, or the like) at coordinates of the output value at each point in time. The display screen generation device 108 outputs the generated display screen data to the display device 110. As the unit of the display range, the number of output value samples included in the display range may be expressed, or the unit of time such as seconds, minutes, or hours may be expressed.

The display device 110 displays a display screen based on the display screen data inputted from the display screen generation device 108. The output value at each point in time within the predetermined display range is illustrated on the display screen. Examples of the display device 110 include an LCD (liquid crystal display) and an OELD (organic electro luminescence display, i.e., organic light-emitting display).

The operation input device 112 accepts the user's operation, and generates an operation signal in accordance with the accepted operation. The operation input device 112 outputs the generated operation signal to the display screen generation device 108. The operation input device 112 may be configured in such a manner as to include a general-purpose member such as, for example, a mouse, a keyboard, or a touch sensor. Alternatively, the operation input device 112 may be configured in such a manner as to include a dedicated member such as, for example, a button, a lever, or a knob. If the operation input device 112 is a touch sensor, the operation input device 112 and the display device 110 may be integrated to form a touchscreen.

The filtering condition setting device 114 determines a filter length being a filtering condition in the LPF device 106 as an aspect of the analysis parameter, on the basis of the operation signal inputted from the operation input device 112. The filtering condition setting device 114 determines a display range and a filter length. The display range is determined on the basis of coordinates designated by an operation signal as in the display screen generation device 108. The filter length is determined in such a manner as to be increased as the determined display range is increased. The filtering condition setting device 114 can determine, for example, a predetermined proportion of the number of output values in the display range, as the filter length. The predetermined proportion is, for example, 5 to 20%. The filtering condition setting device 114 may use the display range determined by the display screen generation device 108 as the filter length determined. The filtering condition setting device 114 outputs filtering condition information indicating the determined filter length to the LPF device 106.

The number of channels of observation data acquired by the data acquisition device 102 is not limited to one, and may be more than one. The LPF device 106 calculates an output value according to the channel, on the basis of an observed value. The display screen generation device 108 may generate display screen data including a graphic representing coordinates of an output value at each point in time according to the channel.

Moreover, the display screen generation device 108 may acquire, from the data storage device 104, time-series data indicating a raw observed value at each point in time in the new display range. The display screen generation device 108 may convert the acquired observed value at each point in time and a time at the point in time into coordinate values in the vertical direction and the horizontal direction, respectively, and generate display screen data further representing graphics representing coordinates of a series of the observed values. Moreover, a straight line indicating a slope of the observed values may be further illustrated in the display screen data.

The display screen generation device 108 may be different in the forms (for example, color, shape, line type, line width, or size, or any combination thereof) of symbols and graphics indicating numerical values of a plurality of systems, and the forms (for example, thickness, size, font type, or font style, or any combination thereof) of characters between the plurality of systems when generating display screen data indicating the numerical values of the plurality of systems. Here, the system indicates a distinction between the observed value, the output value and their slopes; and the channel.

Display Example

Next, a display example of an output value displayed on the display screen is described.

Figure 2:
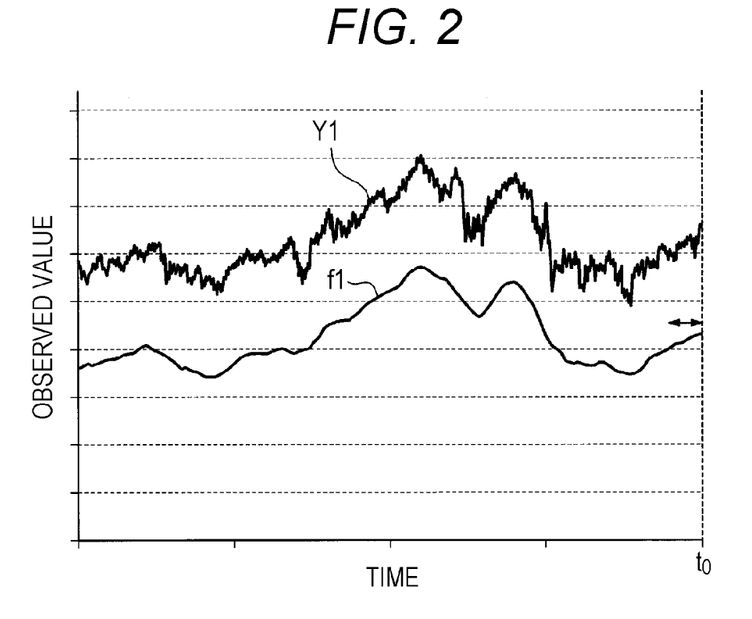
FIG. 2 is a diagram illustrating a display example of an output value according to one or more embodiments of the present invention.

FIG. 2 is a diagram illustrating a display example of the output value. In FIG. 2, the vertical axis indicates the observed value or output value, and the horizontal axis indicates time. The display range includes 800 points up to the current point in time $t_0$. The number of observed value or output value samples used for display is 801 points. The 801 points include both a display starting point in time and the current point in time $t_0$, which correspond respectively to the left and right ends of the display range. The display range is a period set as the initial value in the display screen generation device 108. Y1 indicates an observed value (raw data) at each point in time. An output value f1 is a moving average value of the observed value Y1 within an analysis range with each point in time as the center, the moving average value being calculated in the LPF device 106. However, in the example illustrated in FIG. 2, the output value f1 is displayed at a position displaced two marks lower than a position corresponding to an actual value to be distinguished from the observed value Y1. The display positions of the observed value Y1 and the output value f1 are not necessarily displayed at the positions displaced with respect to each other. The length of a left right arrow indicates an analysis range period of 40 points as the filter length. In the example illustrated in FIG. 2, the endpoint of the analysis range is the current point in time $t_0$. The filter length is a value that is set in the filtering condition setting device 114 in such a manner as to correspond to 5% of the display range.

Figure 3:
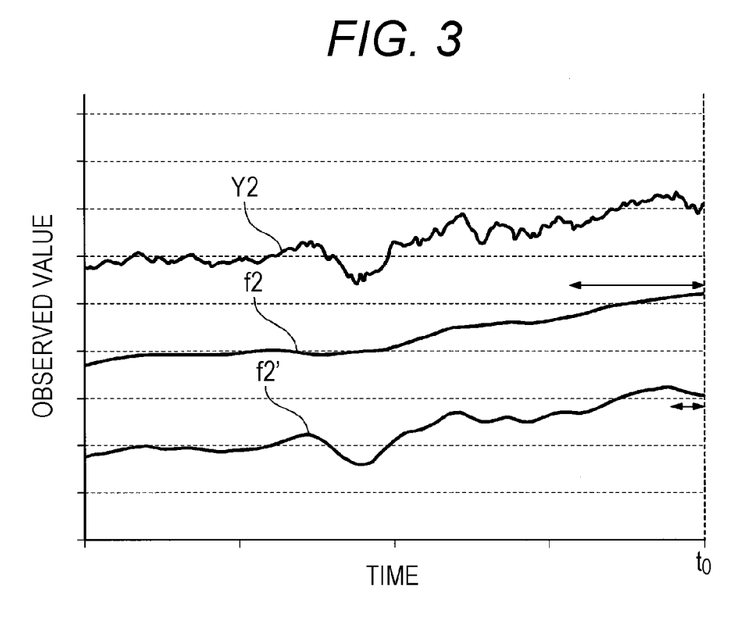
FIG. 3 is a diagram illustrating another display example of the output value according to one or more embodiments of the present invention.

FIG. 3 is a diagram illustrating another display example of the output value. In an example illustrated in FIG. 3, the display range includes 200 points up to the current point in time $t_0$. The display range is a period that is newly set on the basis of an operation signal in the display screen generation device 108. Y2 indicates an observed value at each point in time. An output value f2' is a moving average value of the observed value Y2 within an analysis range with each point in time as the center, the moving average value being calculated in the LPF device 106. On the other hand, an output value f2 illustrates by example a case where the filter length is constant irrespective of the display range as in the typical technology, for the purpose of a comparison with the output value f2'. In this example, the filter length of the output value f2 is 40 points. Moreover, in the example illustrated in FIG. 3, the output values f2 and f2' are displayed at positions displaced two and four marks lower than positions corresponding to actual values, respectively, to be distinguished from the observed value Y2. The display positions of the observed value Y2, and the output values f2 and f2' are not necessarily displayed at the positions displaced with respect to each other. The lengths of left right arrows related to the output values f2 and f2' indicate analysis range periods of 40 points and 10 points as the filter lengths, respectively. In the filtering condition setting device 114, the filter length related to the output value f2' is a value that is set in such a manner as to be 5% of the display range. Hence, when a display range of interest to the user is instructed by the operation input device 112, the filter length determined in conjunction with the instructed display range is used for analysis of the output value f2'. Hence, complicated work for setting the filter length becomes unnecessary. In the example illustrated in FIG. 3, both of the output values f2 and f2' are illustrated for the convenience of description. However, the output value f2 may not be displayed on the display screen generated by the display screen generation device 108.

The filtering condition setting device 114 may further include a filtering condition storage device (not illustrated). Filtering condition data indicating a filter length according to the display range may be previously stored in the filtering condition storage device. The value of the filter length indicated by the filtering condition data can be set in such a manner as to be increased with the increasing display range. Here, the filtering condition setting device 114 refers to the filtering condition data, and specifies a filter length corresponding to the display range indicated by the display range data inputted from the display screen generation device 108 into the display device.

In the above-description, the case where the low-pass process performed by the LPF device 106 is a moving average is illustrated by example. However, the aspect of the low-pass process is not limited to a moving average. The LPF device 106 may be configured as a FIR (finite impulse response) filter. In this case, the LPF device 106 configured as the FIR filter uses a predetermined number of (two or more) filter coefficients to perform a convolution operation on an observed value at each point in time within the analysis range. In this manner, the LPF device 106 calculates an output value at each point in time. The number of filter coefficients at each point in time within the analysis range corresponds to the above-mentioned filter length. The filter coefficients at each point in time within the analysis range can also be regarded as a type of time-series data. The filtering condition setting device 114 may determine the filter coefficients at each point in time in such a manner that the shape (frequency characteristic) of a curve having a damping factor in the frequency domain, the curve being indicated by these filter coefficients, is constant irrespective of the filter length. In order to make the shape of the curve having the damping factor in the frequency domain constant, the filtering condition setting device 114 may interpolate predetermined filter coefficients offering a waveform reference to calculate changed filter coefficients, or may determine that function values of predetermined functions offering the waveform reference are the changed filter coefficients. Here, the waveform reference indicates a waveform as a reference, that is, a temporal change in a constant real number. The LPF device 106 uses the filter coefficients determined by the filtering condition setting device 114 to perform a convolution operation. Generally, the longer the filter length, the lower the cutoff frequency and the more similar the low cutoff characteristics based on the determined filter coefficients. The moving average can also be regarded as a type of FIR filter using a plurality of filter coefficients within the analysis range, the plurality of filter coefficients being the same as each other.

Moreover, the LPF device 106 may be configured as an IIR (infinite impulse response) filter. The LPF device 106 configured as the IIR filter subtracts a second convolution value from a first convolution value to calculate an output value at a target point in time. The first convolution value is obtained by using a first filter length and filter coefficients. Specifically, the first convolution value is obtained by a convolution operation on an observed value at each point in time within a first analysis range up to a target point in time. The second convolution value is obtained by using a second filter length and filter coefficients. Specifically, the second convolution value is obtained by a convolution operation on an observed value at each point in time within a second analysis range up to a target point in time. Here, the filtering condition setting device 114 can determine that each of the first and second filter lengths is increased with the increasing display range. The LPF device 106 can set the first and second filter lengths determined by the filtering condition setting device 114 as the lengths of the first and second analysis ranges. For example, when the LPF device 106 determines the first and second filter coefficients, the shapes of curves having a damping factor in the frequency domain, the curves being indicated by the first and second filter coefficients, may be constant. Furthermore, at this point in time, the ratio of the first filter length and the second filter length may also be constant. The filter coefficients are calculated in such a manner that even if the cutoff frequency is tied to the display range, the shape of the low-pass cutoff characteristics (the shape of the curve indicating the damping factor in the frequency domain) is maintained. In other words, the IIR filter does not determine the cutoff frequency only with the filter length, unlike the FIR filter. One set of analysis parameters including a filter length and filter coefficients at each point in time within the analysis range is associated with the cutoff frequency. Therefore, the filtering condition setting device 114 is required to determine analysis parameters corresponding to the cutoff frequency in such a manner that as the display range (data range) determined on the basis of an operation signal is increased, the cutoff frequency is reduced.

Next, another example of one or more embodiments of the present invention is described. The same reference numerals are assigned to the same configurations as the aforementioned embodiments, and their descriptions are quoted. Different points from the aforementioned embodiments are mainly described below.

Figure 4:
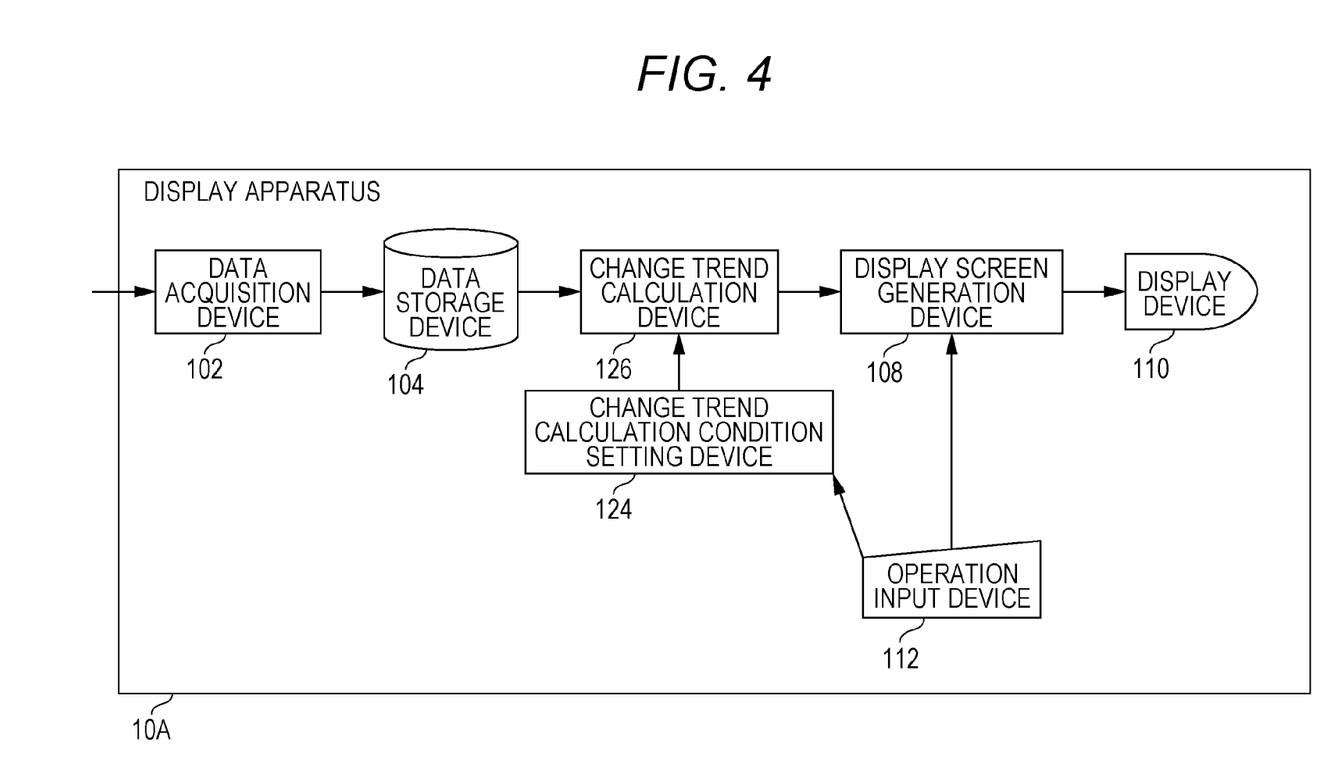
FIG. 4 is a block diagram illustrating an example of the configuration of a display apparatus according to one or more embodiments of the present invention.

FIG. 4 is a block diagram illustrating an example of the configuration of a display apparatus according to one or more embodiments of the present invention.

A display apparatus 10A according to one or more embodiments of the present invention is configured in such a manner as to include the data acquisition device 102, the data storage device 104, the display screen generation device 108, the display device 110, the operation input device 112, a change trend calculation condition setting device 124, and a change trend calculation device 126. In other words, the display apparatus 10A includes the change trend calculation device 126 and the change trend calculation condition setting device 124 instead of the LPF device 106 and the filtering condition setting device 114.

The change trend calculation condition setting device 124 determines an analysis range by the same method as the display screen generation device 108 on the basis of an operation signal inputted from the operation input device 112. The analysis range is a condition for the change trend calculation device 126 to calculate a change trend in an observed value. The change trend calculation condition setting device 124 determines the analysis range in such a manner as to be increased as the determined display range is increased. A method in which the change trend calculation condition setting device 124 determines an analysis range on the basis of a display range may be similar to a method in which the filtering condition setting device 114 determines a filter length on the basis of a display range. For example, the change trend calculation condition setting device 124 can determine a predetermined proportion of the number of output values within the display range, as the analysis range. The predetermined proportion is, for example, 5 to 20%. The change trend calculation condition setting device 124 outputs change trend calculation condition information including the determined analysis range to the change trend calculation device 126.

Time-series data indicating an observed value at each point in time up to the current point in time is inputted from the data storage device 104 into the change trend calculation device 126. The change trend calculation device 126 specifies an analysis range indicated by change trend condition information inputted from the change trend calculation condition setting device 124, and determines an analysis range with the current point in time as the endpoint. The change trend calculation device 126 uses the time-series data to calculate a slope of a linear function indicating a change trend in an observed value at each point in time within the analysis range in such a manner as to minimize an objective function. In other words, the slope is calculated as an index of the change trend. The objective function is a weighted sum of squares of a difference value between a function value of the linear function and an observed value at each point in time. A weight coefficient at each point in time may be any numerical value as long as the weight coefficient at each point in time is increased as the elapsed time from a reference point in time to the point in time is increased. The change trend calculation device 126 outputs change trend data indicating the calculated slope to the display screen generation device 108. The display screen generation device 108 generates, as display screen data, a straight line having the slope of the change trend data inputted from the change trend calculation device 126.

The change trend calculation device 126 may output a moving average value calculated in the course of calculating the slope, as the output value, to the display screen generation device 108, or output a raw observed value instead of the moving average value, or together with the moving average value, to the display screen generation device 108. The change trend calculation device 126 determines that a moving average section used upon calculating the moving average value is double the analysis range.

(Change Trend Calculation Method)

Next, a specific example of a method for calculating a change trend in time-series data is described.

Here, an observed value at time $t_i$ configuring time-series data inputted into the change trend calculation device 126 is expressed as $x_{t_i}$. i is an integer indicating the order of points in time. Time $t_N$ indicates a time at the current point in time. A window size W is set in the change trend calculation device 126. The window size W corresponds to the number, 2K+1, of observed values within the moving average section. K is an integer equal to or greater than one indicating the number of observed values within the analysis range.

The change trend calculation device 126 calculates a moving average $<x_{t_{N-K}}>$ at a reference point in time $t_{N-K}$ being a past time point K back from the current point in time $t_N$. In this stage, the observed value at the current point in time $t_N$ is the latest observed value. At the point in time $t_N$, a moving average at a time later than the reference point in time $t_{N-K}$ cannot be calculated. Hence, the change trend calculation device 126 calculates a function value of a linear function indicating a change trend in the observed value at each time later than the reference point in time $t_{N-K}$. The change trend calculation device 126 employs the moving average $<x_{t_{N-K}}>$ at the reference point in time $t_{N-K}$ as a function value at the reference point in time $t_{N-K}$. The change trend calculation device 126 uses moments regression to calculate a slope $a_{t_N}$ of a linear function $<x_{t_{N-K}}>+a_{t_N}(t_{N-K+i}-t_{N-K})$ at each time $t_{N-K+i}$. Moments regression is, for example, a method for minimizing an objective function J illustrated in equation (1) to calculate the slope $a_{t_N}$.

$$J = \sum_{i=1}^{K} \{(x_{t_{N-K+i}} - <x_{t_{N-K}}>) - a_{t_N}(t_{N-K+i} - t_{N-K})\}^2 (t_{N-K+i} - t_{N-K}) \tag{1}$$

In equation (1), $t_{N-K+i}-t_{N-K}$ indicates the elapsed time from the reference point in time $t_{N-K}$ at time $t_{N-K+i}$. Moreover, the value $<x_{t_{N-K}}>+a_{t_N}(t_{N-K+i}-t_{N-K})$ subtracted within { ... } corresponds to a function value of the time $t_{N-K+i}$ of the linear function. Therefore, equation (1) indicates that the objective function is obtained by taking the sum of multiplied values within the analysis range, the multiplied values being obtained by multiplying, by the elapsed time $t_{N-K+i}-t_{N-K}$, a square value of a difference value obtained by subtracting the function value of the linear function from the observed value $x_{t_{N-K+i}}$ at time $t_{N-K+i}$. In equation (1), a portion represented by { ... } is a term used in a normal least squares method.

The change trend calculation device 126 uses a relationship given by equation (2) when calculating the slope $a_{t_N}$ to minimize the objective function J illustrated in equation (1).

$$a_{t_N} = \frac{\sum_{i=1}^{K} (x_{t_{N-K+i}} - <x_{t_{N-K}}>)(t_{N-K+i} - t_{N-K})^2}{\sum_{i=1}^{K} (t_{N-K+i} - t_{N-K})^3} \tag{2}$$

Equation (2) is derived from a condition that the derivative obtained by differentiating the objective function J with respect to the slope $a_{t_N}$ is zero.

In the above-mentioned example, when the objective function J is calculated, the square value of the difference value is multiplied by the elapsed time $t_{N-K+i}-t_{N-K}$. Hence, the newer the observed value is, the more the difference value between the observed value and the function value contributes to the objective function J. Hence, the temporal change of an observed value close to the current point in time is more focused. Therefore, the function value indicating a change trend close to the intuition of the user is estimated without generating a delay in the phase of the function value with respect to the phase of the observed value. Noise of a high-frequency component may be superimposed on an observed value. However, according to the above-mentioned method, the noise of the high-frequency component is reduced or removed. Hence, the slope by this method is more stable than a slope calculated by a first derivative filter. From another point of view, a temporal change in a slope of a linear function calculated at each point in time is mitigated more than a slope obtained by simply differentiating a function representing time-series data of observed values. Moreover, a temporal change in a function value of a linear function at each point in time (including a function value at the current point in time), the function value being calculated by using the calculated slope, is also smoothed more than a temporal change in raw observed values.

As long as the set analysis range up to the current point in time $t_N$ is a fixed period of time, the change trend calculation device 126 can calculate the slope $a_{t_N}$ by using equation (2) even if a missing point where the observed value cannot be acquired is present in a part of the analysis range. Hence, even if there is missing data in a situation where the measurement value in the data acquisition device 102 cannot be temporarily measured, for example, when a temporary failure occurs in the whole or a part of the function of the field device that obtains the observed value, when the whole or a part of the function of the field device that obtains the observed value temporarily stops, or when there is transmission loss caused by the network that transmits the observation data, the function value can be stably calculated.

The above-mentioned example can also be applied to a case where the intervals between points in time are irregular. However, when the intervals between points in time are constant intervals d, equation (1) is modified as illustrated in equation (3).

$$J = \sum_{i=1}^{K} \{(x_{t_{N-K+i}} - <x_{t_{N-K}}>) - a_{t_N} id\}^2 id \tag{3}$$

In equation (3), the time $t_i$ is $t_1+(i-1)$ d. The relationship illustrated in equation (4) is obtained as the condition that the derivative obtained by differentiating the objective function J illustrated in equation (3) with respect to the slope $a_{t_N}$ is zero.

$$a_{t_N} = \frac{\sum_{i=1}^{K} (x_{t_{N-K+i}} - <x_{t_{N-K}}>)(id)^2}{\sum_{i=1}^{K} (id)^3} \tag{4}$$

The denominator of equation (4) is a constant. The value of the constant is $K^2(K+1)^2 \cdot d^3/4$. The change trend calculation device 126 is simply required to use a preset constant when calculating the slope $a_{t_N}$ by using the relationship illustrated in equation (4). A process for sequentially calculating constants is omitted to further reduce the amount of calculation. Hence, placement in a device whose computation resource is relatively small (for example, an incorporated device), or the like becomes easy.

The case where a weight coefficient $w_i$ by which the square value of the difference between the observed value at each point in time $t_{N-K}$ and the function value is multiplied is proportional to the elapsed time $t_{N-K+i}-t_{N-K}$ from the reference point in time $t_{N-K}$ is taken as an example of the objective function J illustrated in equation (3). However, the objective function J is not limited to this example. The weight coefficient $w_i$ may be generalized to a monotonously increasing positive value with the increasing elapsed time $t_{N-K+i}-t_{N-K}$. It is also possible to preset the weight coefficient $w_i$ as an element value of a K-dimensional weight coefficient vector in the change trend calculation device 126. In this case, the objective function J illustrated in equation (3) is generalized as illustrated in equation (5).

$$J = \sum_{i=1}^{K} \{(x_{t_{N-K+i}} - <x_{t_{N-K}}>) - a_{t_N} id\}^2 w_i \qquad (5)$$

The relationship illustrated in equation (6) is obtained as a condition that the derivative obtained by differentiating the objective function J illustrated in equation (5) with respect to the slope $a_{t_N}$ is zero. The change trend calculation device 126 may calculate the slope $a_{t_N}$ by using equation (6).

$$a_{t_N} = \frac{\sum_{i=1}^{K}(x_{t_{N-K+i}} - <x_{t_{N-K}}>)id \cdot w_i}{\sum_{i=1}^{K}(id)^2 w_i} \qquad (6)$$

If the intervals between points in time are irregular, the change trend calculation device 126 may calculate the slope $a_{t_N}$ by using equation (7).

$$a_{t_N} = \frac{\sum_{i=1}^{K}(x_{t_{N-K+i}} - <x_{t_{N-K}}>)(t_{N-K+i}-t_{N-K})w_i}{\sum_{i=1}^{K}(t_{N-K+i}-t_{N-K})^2 w_i} \qquad (7)$$

Equation (7) is obtained by replacing the elapsed time $t_{N-K+i}-t_{N-K}$ from the reference point in time $t_{N-K}$ in equation (2) with the weight coefficient $w_i$.

Moreover, as illustrated in equation (8), the change trend calculation device 126 may calculate the slope $a_{t_N}$ by using, as the weight coefficient $w_i$, a function w(t) depending on the elapsed time t from the reference point in time $t_{N-K}$.

$$a_{t_N} = \frac{\sum_{i=1}^{K}(x_{t_{N-K+i}} - <x_{t_{N-K}}>)(t_{N-K+i}-t_{N-K})w(t_{N-K+}-t_{N-K})}{\sum_{i=1}^{K}(t_{N-K+i}-t_{N-K})^2 w(t_{N-K+i}-t_{N-K})} \qquad (8)$$

As an example, the above-mentioned change trend calculation device 126 calculates a slope indicating a temporal change trend in the observed value at each point in time in such a manner as to minimize the weighted sum of squares of the difference value between the observed value at each point in time and the function value of the linear function as the objective function. However, the calculation method is not limited to this. For example, the change trend calculation device 126 may calculate the slope indicating the temporal change trend in the observed value at each point in time in such a manner as to minimize the sum of squares of the difference value between the observed value at each point in time and the function value of the linear function as the objective function.

Display Example

Next, a display example of a slope displayed on the display screen is described.

Figure 5:
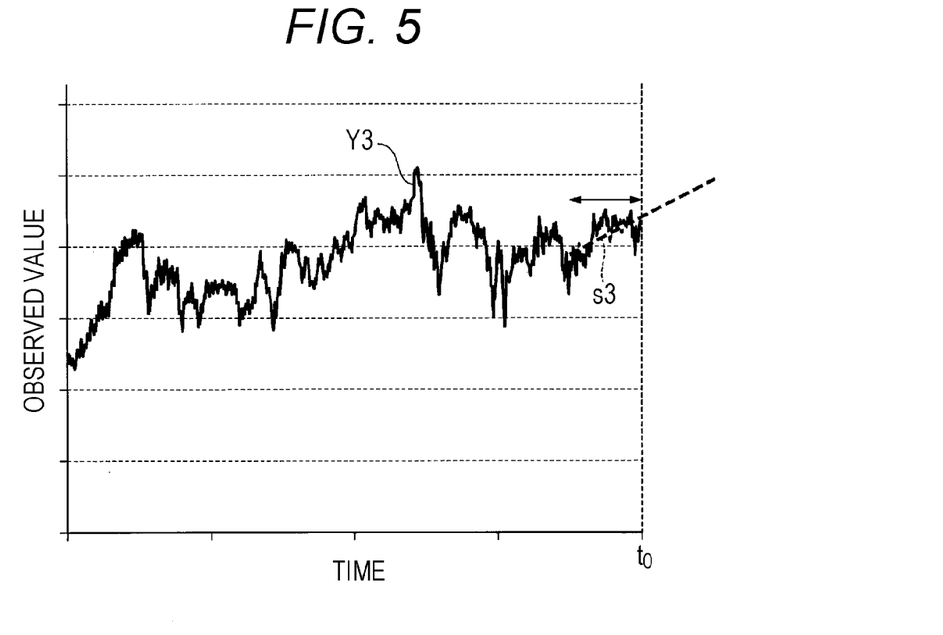
FIG. 5 is a diagram illustrating a display example of a slope according to one or more embodiments of the present invention.

In FIG. 5, the vertical axis indicates the observed value, and the horizontal axis indicates time. The display range includes 800 points up to the current point in time $t_0$. The display range is a period set as the initial value in the display screen generation device 108 and the change trend calculation condition setting device 124. However, a starting point of the display range is not included in the counted value in the display range. Y3 indicates an observed value (raw data) at each point in time. s3 is a straight line indicating a slope calculated by the change trend calculation device 126 on the basis of the observed values Y3. A left right arrow indicates an analysis range of the observed values Y3. An endpoint of the analysis range is the current point in time $t_0$. In an example illustrated in FIG. 5, the analysis range is a period determined by the change trend calculation condition setting device 124 in such a manner as to be 12.5% (100 points) of the display range. The straight line s3 is displayed up to a future point in time 100 points ahead of the current point in time $t_0$. A function value indicated by the straight line s3 in a section after the current point in time $t_0$ indicates predicted values based on a slope indicating a change trend in the observed value Y3 at the current point in time $t_0$. Consequently, even a user who does not have special experience or knowledge can predict the state of a plant or the like related to the observed value Y3 by becoming exposed to the predicted values.

Figure 6:
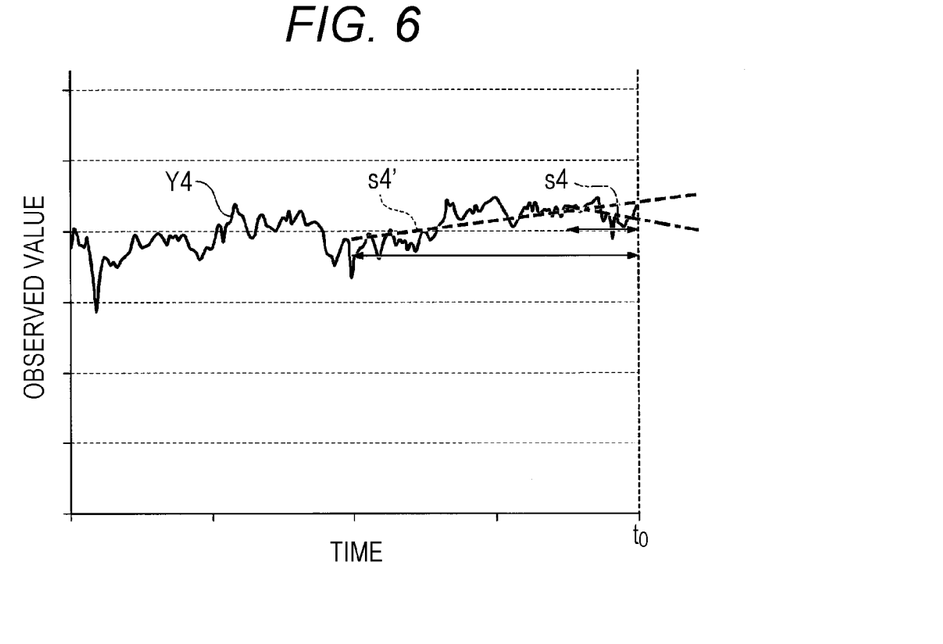
FIG. 6 is a diagram illustrating another display example of the slope according to one or more embodiments of the present invention.

FIG. 6 is a diagram illustrating another example of the slope. In an example illustrated in FIG. 6, the display range includes 200 points up to the current point in time $t_0$. The display range is a period that is newly set on the basis of an operation signal in the display screen generation device 108. However, a starting point of the display range is not included in the counted value of the display range. Y4 indicates an observed value at each point in time. Each of s4 and s4' is a straight line indicating a slope calculated in the change trend calculation device 126. A slope of the straight line s4 is calculated on the basis of an analysis range determined in accordance with a display range. In other words, the analysis range is a value that is set in the change trend calculation condition setting device 124 in such a manner as to be 12.5% of the display range. On the other hand, a slope of the straight line s4' is calculated on the basis of an analysis range fixed at a constant value, irrespective of the display range, as in the typical technology. In the example illustrated in FIG. 6, the analysis range of the straight line s4' includes 100 points as in the example illustrated in FIG. 5. The lengths of left right arrows related to the straight lines s4 and s4' indicate analysis ranges including 25 points and 100 points, respectively. As indicated by the straight line s4', a slope indicating a change trend in observed values is calculated on the basis of the analysis range in accordance with a display range (data range) designated by the user's operation. For example, the display range is reduced to reduce the analysis range. When a shorter display range is instructed, it usually corresponds to a case where the user takes interest in a more detailed temporal change in observed values. In such a case, observed values within a shorter analysis range are expected to become targets for analyzing a change trend. In the example illustrated in FIG. 6, the straight line s4 indicates a trend that the observed value within the analysis range is reduced over time. Conversely, when a longer display range is instructed, it usually corresponds to a case where the user takes interest in a more general view of a temporal change in observed values. In such a case, observed values within a longer analysis range are expected to become targets for analyzing a change trend as indicated by the straight line s4'. In the example illustrated in FIG. 6, the straight line s4' indicates a trend that the observed value within the analysis range is increased over time. In this manner, the change trend calculation condition setting device 124 determines an analysis range in conjunction with the designated display range. Hence, a simple operation allows the user to determine a convenient analysis range in terms of observing a change trend in observed values.

If there is a plurality of channels of observation data acquired by the data acquisition device 102, the change trend calculation device 126 may calculate a slope on the basis of observed values according to the channel. The display screen generation device 108 may then generate display screen data representing a straight line indicating the slope at each point in time according to the channel.

In this case, observed values of the plurality of channels whose change trends are different from each other, and their slopes are displayed on the display screen. When the user designates a display range with an operation, an analysis range in accordance with the designated display range is determined. Hence, when the user observes change trends in the observed values of the plurality of channels, a simple operation allows the user to determine a desired analysis range to observe the observed values of each individual channel. Moreover, the analysis range is freely set in accordance with the observed value that is different in the change trend according to the channel. Accordingly, the possibility to overlook modulation of a change trend in observed values is reduced.

As described above, the display apparatus (for example, the display apparatuses 10 and 10A) according to the above-mentioned embodiments includes the display screen generation device (for example, the display screen generation device 108), the computation device (for example, the LPF device 106 and the change trend calculation device 126), and the analysis condition setting device (for example, the filtering condition setting device 114 and the change trend calculation condition setting device 124). The display screen generation device determines, on the basis of an operation, a display range (data range) to display an analysis result of an observed value at each point in time (for example, an output value from the LPF device 106 and a change trend from the change trend calculation device 126). The computation device computes a waveform analysis value or trend value from observed values within a predetermined analysis range. The analysis condition setting device determines an analysis range in such a manner as to be increased with the increasing display range.

According to this configuration, the size of the analysis range for the display range determined on the basis of an operation is set as a computation condition. A trend value is computed from an observed value within the analysis range given as the set computation condition. Hence, an operation that is performed only for designating the analysis range becomes unnecessary. Moreover, even if the user does not have special experience or knowledge about the designation of the analysis range, the analysis range for computing observed values is set in accordance with the size of the display range of interest to the user. Hence, the user does not need to designate the analysis range on an as-needed basis.

Moreover, the computation device according to the aforementioned embodiments includes the low-pass filter device (for example, the LPF device 106). The low-pass filter device calculates an output value having a low-frequency component as a component having a lower frequency than a predetermined cutoff frequency, in a temporal change in an observed value.

According to the configuration, a filter length in accordance with a display range determined on the basis of an operation is set as the filtering condition. The LPF process with the set filter length is executed on an observed value. Hence, a high-frequency component having a higher frequency than a cutoff frequency in accordance with the set filer length is reduced or cut off in an output value obtained by the LPF process. Hence, a cutoff frequency in accordance with the filter length is set at every change in the display range. Hence, the user can monitor an output value obtained under the cutoff frequency suitable for the display range of interest to the user. It is in turn possible to prevent the overlooking of an abnormality in a temporal change in output values that tends to occur due to a set unsuitable cutoff frequency.

Moreover, the computation device according to one or more embodiments of the present invention includes the change trend calculation device (for example, the change trend calculation device 126). The change trend calculation device calculates a slope of a linear function indicating a change trend in observed values within the analysis range in such a manner as to minimize an objective function. The objective function is the sum of multiplied values at points in time within the analysis range. The multiplied value is a numerical value obtained by multiplying a square value of a difference between a function value of the linear function and the observed value by a weight coefficient. The value of the weight coefficient is increased with increasing elapsed time from a starting point of the analysis range up to each point in time.

According to this configuration, the slope of the linear function is calculated, placing greater importance on an observed value at a point in time closer to the current point in time. Hence, the phase of the function value of the linear function indicating the change trend in observed values is not delayed with respect to the observed value at the current point in time. Therefore, a random temporal change in observed values is reduced or removed. In addition, a slope is calculated as a trend value indicating the quantified change trend in observed values matching the intuition of a person. Hence, the user can appropriately judge a change trend in observed values by monitoring the slope. Moreover, a slope at the current point in time is calculated by using the observed values within the analysis range in accordance with the display range determined on the basis of an operation. Hence, the analysis range in accordance with the display range is set at every change in the display range. Hence, the user can monitor the slope suitable for the display range of interest. It is in turn possible to avoid the overlooking of an abnormality or an event pointing to a sign of the abnormality, which tends to happen due to a fixed analysis range.

Modified Example

As described above, the embodiments of the present invention have been described with reference to the drawings. However, the specific configuration is not limited to these embodiments. Various design changes and the like can be made within the scope that does not depart from the gist of the embodiments of the present invention.

In the examples illustrated in FIGS. 1 and 4, the display device 110 and the operation input device 112 are integral with other portions in the display apparatuses 10 and 10A. However, specific configurations of the display apparatuses 10 and 10A are not limited to these examples.

The display apparatuses 10 and 10A may not be an operation monitoring terminal for an operator to monitor the state of the operation of a control apparatus, or a plant facility being a control target. Moreover, the display apparatuses 10 and 10A may not be a device management terminal for maintenance personnel to manage the control apparatus, the operating state of, for example, an I/O module or field device, or the state of the plant facility. The display apparatus 10 may be configured as a terminal apparatus of, for example, a personal computer, a workstation, a business-grade mobile terminal apparatus (a tablet), or a multi-function mobile phone.

Moreover, the display apparatuses 10 and 10A may be configured as various measurement apparatuses such as an oscilloscope, or as various data analysis apparatuses such as a data analyzer.

The display apparatuses 10 and 10A may calculate a change trend in output values obtained by performing the low-pass process on observed values, instead of a change trend in observed values. For example, the LPF device 106 of the display apparatus 10 may calculate a slope of the output values obtained by performing the low-pass process on the observed values through a predetermined first derivative filter. The first derivative filter is a filter for calculating, for example, a difference between an output value at the subsequent point in time being a target point in time that is a processing target, and an output value at the previous point in time, as the slope. The display screen generation device 108 may generate display screen data indicating a straight line of a function value of a linear function having the slope calculated by the LPF device 106 and taking an output value at the target point in time as an origin.

Moreover, the change trend calculation device 126 of the display apparatus 10A may perform a computation indicated by any of equations (2), (4), (6), (7), and (8) on an output value obtained by performing the low-pass process on an observed value to calculate a slope.

Moreover, values indicated by observation data being a processing target are not limited to the above-mentioned observed value, state value, and the like. The display apparatus according to one or more embodiments of the present invention can also be effectively applied to time-series data in any field as the observation data as long as it is time-series data including a random temporal change component and many observed values. The display apparatus according to one or more embodiments of the present invention can be applied to, for example, heart rate and blood pressure as observed values in the medical field. Examples of the applicable observed values in the financial and commerce fields include the price of a security such as a stock price, the exchange rates of foreign exchange and the like, and a product price. Examples of the applicable observed values in security or monitoring of the operation of a device include the volumes of an environment sound and an operation sound, and a fundamental frequency.

The process control system according to one or more embodiments of the present invention may be configured in such a manner that a part of the display apparatuses 10 and 10A is realized by a computer. In this case, the control function may be realized in such a manner that a program for achieving the control function is recorded in a non-transitory computer-readable recording medium, the recorded program is read into a computer system, and the read program is executed by a computation processing circuit such as a CPU. Accordingly, the control function may be achieved. The "computer system" here is a computer system embedded in the display apparatuses 10 and 10A. An OS and hardware such as a peripheral device are also included in the computer system. Moreover, examples of the "computer-readable recording medium" include storage devices such as portable media including a flexible disk, a magneto-optical disk, a ROM, and a CD-ROM, and a hard disk built in the computer system. Furthermore, the "computer-readable recording medium" also includes: a recording medium that holds the program dynamically in short time, such as a communication line that transmits the program via a communication line such as a network, for example, the Internet, and a telephone line; and a recording medium that holds the program for a fixed period of time, such as volatile memory in a server, or the computer system acting as a client in this case. Moreover, the program may be a program for achieving a part of the above-mentioned functions. Furthermore, the above-mentioned functions may be achieved in a combination with the program that has already been recorded in the computer system.

Moreover, a part or all of the display apparatuses 10 and 10A in the above-mentioned embodiments may be realized as an integrated circuit such as LSI (large scale integration). Each functional block of the display apparatuses 10 and 10A may be made as an integrated circuit. Moreover, a part or all of the functional blocks may be integrated by being circuitized. Moreover, a method for integrating circuits is not limited to LSI. An integrated circuit may be realized by a dedicated circuit or general-purpose processor. Moreover, if a technology for the integration of circuits as an alternative to LSI appears with the progress of the semiconductor technology, an integrated circuit by the technology may be used.

The display apparatus according to one or more embodiments of the present invention may be the following first to sixth display apparatuses:

The first display apparatus includes: an operation input device configured to designate a data range of an observed value; an analysis condition setting device configured to determine an analysis range or an analysis parameter of the observed value, corresponding to the number of samples within the data range; a computation device configured to analyze a waveform or a trend of the observed value on the basis of the analysis range or analysis parameter; and a display screen generation device configured to cause at least a display device to display a waveform or a straight line of a computation result of the computation device.

The second display apparatus is the first display apparatus characterized in that the computation device performs a low-pass filter operation on the observed value on the basis of the analysis range or analysis parameter, and the display screen generation device causes the display device to display a waveform of a result of the low-pass filter operation of the computation device.

The third display apparatus is the second display apparatus characterized in that the analysis condition setting device calculates, from the data range, a filter length and a filter coefficient, which correspond to a cutoff frequency of the low-pass filter operation.

The fourth display apparatus is any of the first to third display apparatuses characterized in that the computation device performs a computation on a slope indicating a change trend in the observed value on the basis of the analysis range or analysis parameter, and the display screen generation device causes the display device to display a waveform of the observed value and a straight line indicating a slope for the waveform.

The fifth display apparatus is the fourth display apparatus in which the computation device includes a change trend calculation device configured to include the analysis range and calculate a slope of a linear function indicating the change trend in the observed values within the analysis range in such a manner as to minimize an objective function.

The sixth display apparatus is any of the second to fifth display apparatuses in which the analysis condition setting device determines the analysis range at a predetermined proportion of the data range.

The display method according to one or more embodiments of the present invention may be the following first or second display method:

The first display method is a display method in a display apparatus, and includes: an operation input step of an operation input device designating a data range of an observed value; an analysis condition setting step of determining an analysis range or an analysis parameter of the observed value, corresponding to the number of samples within the data range; a computation step of analyzing a waveform or a trend of the observed value on the basis of the analysis range or analysis parameter; and a display screen generation step of causing at least a display device to display a waveform or a straight line of a computation result of the computation step.

The second display method is the first display method characterized in that the computation step includes performing a low-pass filter operation on the observed value on the basis of the analysis range or analysis parameter, and the display screen generation step includes causing the display device to display a waveform of a result of the low-pass filter operation by the computation step.

The program according to one or more embodiments of the present invention may be the following first or second program:

The first program is a program for causing a computer of a display apparatus to execute: an operation input procedure of an operation input device designating a data range of an observed value; an analysis condition setting procedure of determining an analysis range or an analysis parameter of the observed value, corresponding to the number of samples within the data range; a computation procedure of analyzing a waveform or a trend of the observed value on the basis of the analysis range or analysis parameter; and a display screen generation procedure of causing at least a display device to display a waveform or a straight line of a computation result of the computation procedure.

The second program is the first program characterized in that the computation procedure includes performing a low-pass filter operation on the observed value on the basis of the analysis range or analysis parameter, and the display screen generation procedure includes causing the display device to display a waveform of a result of the low-pass filter operation by the computation step.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:
1. A display apparatus comprising:
an operation input device that receives an operation signal, and designates a display range of an observed value with coordinates specified by the operation signal;
an analysis condition setting device that determines, as an analysis range or an analysis parameter of the observed value, a predetermined proportion, that ranges from 5% to 20%, of a number of samples included in the display range, wherein the larger the display range, the larger the predetermined proportion;
a computation device that analyzes a waveform or a trend of the observed value based on the analysis range or the analysis parameter; and
a display screen generation device that causes a display device to display a waveform or a straight line as a computation result of the computation device.

2. The display apparatus according to claim 1, wherein the computation device executes a low-pass filter operation on the observed value based on the analysis range or the analysis parameter, and
the display screen generation device causes the display device to display a waveform of a result of the low-pass filter operation by the computation device.

3. The display apparatus according to claim 2, wherein the analysis condition setting device calculates, within the display range, a filter length and a filter coefficient that correspond to a cutoff frequency of the low-pass filter operation.

4. The display apparatus according to claim 1, wherein the computation device calculates a slope indicating a change trend in the observed value based on the analysis range or the analysis parameter, and
the display screen generation device causes the display device to display a waveform of the observed value and a straight line having the calculated slope corresponding to the waveform.

5. The display apparatus according to claim 2, wherein the computation device calculates a slope indicating a change trend in the observed value based on the analysis range or the analysis parameter, and the display screen generation device causes the display device to display a waveform of the observed value and a straight line having the calculated slope corresponding to the waveform.

6. The display apparatus according to claim 4, wherein the computation device includes a change trend calculation device that calculates a slope of a linear function indicating the change trend in the observed values within the analysis range so as to minimize an objective function.

7. The display apparatus according to claim 5, wherein the computation device includes a change trend calculation device that calculates a slope of a linear function indicating the change trend in the observed values within the analysis range so as to minimize an objective function.

8. The display apparatus according to claim 2, wherein the analysis condition setting device determines that a predetermined proportion of the analysis range is the display range.

9. A display method using a display apparatus, the method comprising:
   receiving an operation signal, and designating a display range of an observed value with coordinates specified by the operation signal;
   setting, as an analysis range or an analysis parameter of the observed value, a predetermined proportion, that ranges from 5% to 20%, of a number of samples included in the display range, wherein the larger the display range, the larger the predetermined proportion;
   analyzing a waveform or a trend of the observed value based on the analysis range or the analysis parameter; and
   displaying a waveform or a straight line as a computation result of the computation step.

10. The display method according to claim 9, wherein
   analyzing includes executing a low-pass filter operation on the observed value based on the analysis range or the analysis parameter, and
   displaying a waveform or a straight line includes displaying a waveform of a result of the low-pass filter operation.

11. A non-transitory computer-readable recording medium recording a program for causing a computer included in a display apparatus to execute:
   receiving an operation signal, and designating a display range of an observed value with coordinates specified by the operation signal;
   determining, as an analysis range or an analysis parameter of the observed value, a predetermined proportion, that ranges from 5% to 20%, of a number of samples included in the display range, wherein the larger the predetermined proportion;
   analyzing a waveform or a trend of the observed value based on the analysis range or the analysis parameter; and
   causing a display device to display a waveform or a straight line as a computation result of the computation command.

12. The recording medium according to claim 11, wherein
   the analyzing includes causing a low pass filter operation to be executed on the observed value based on the analysis range or the analysis parameter, and
   the causing the display device includes causing the display device to display a result of the low-pass filter operation.

* * * * *